July 6, 1948.
G. E. COATS
2,444,808
DUMP VEHICLE
Filed Oct. 11, 1946
3 Sheets-Sheet 1
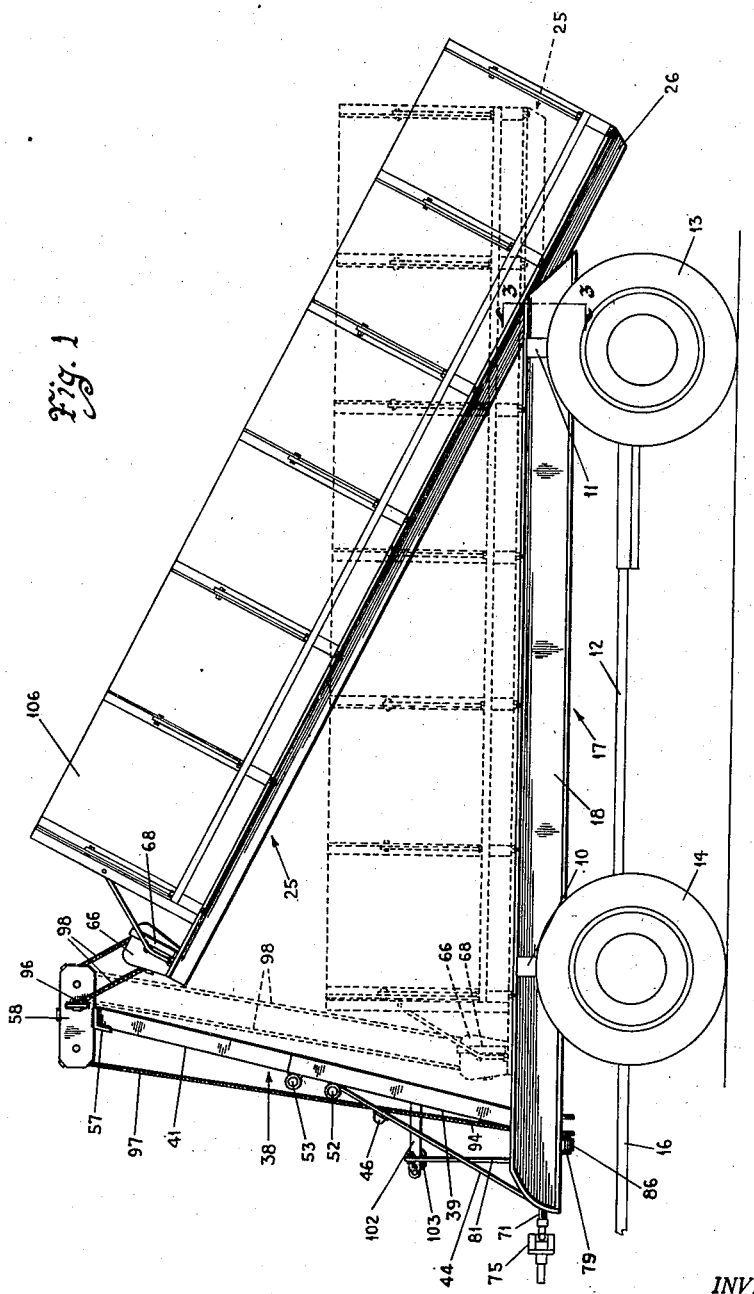
INVENTOR.
Gilbert E. Coats
BY
Rudolph L. Lowell
Attorney

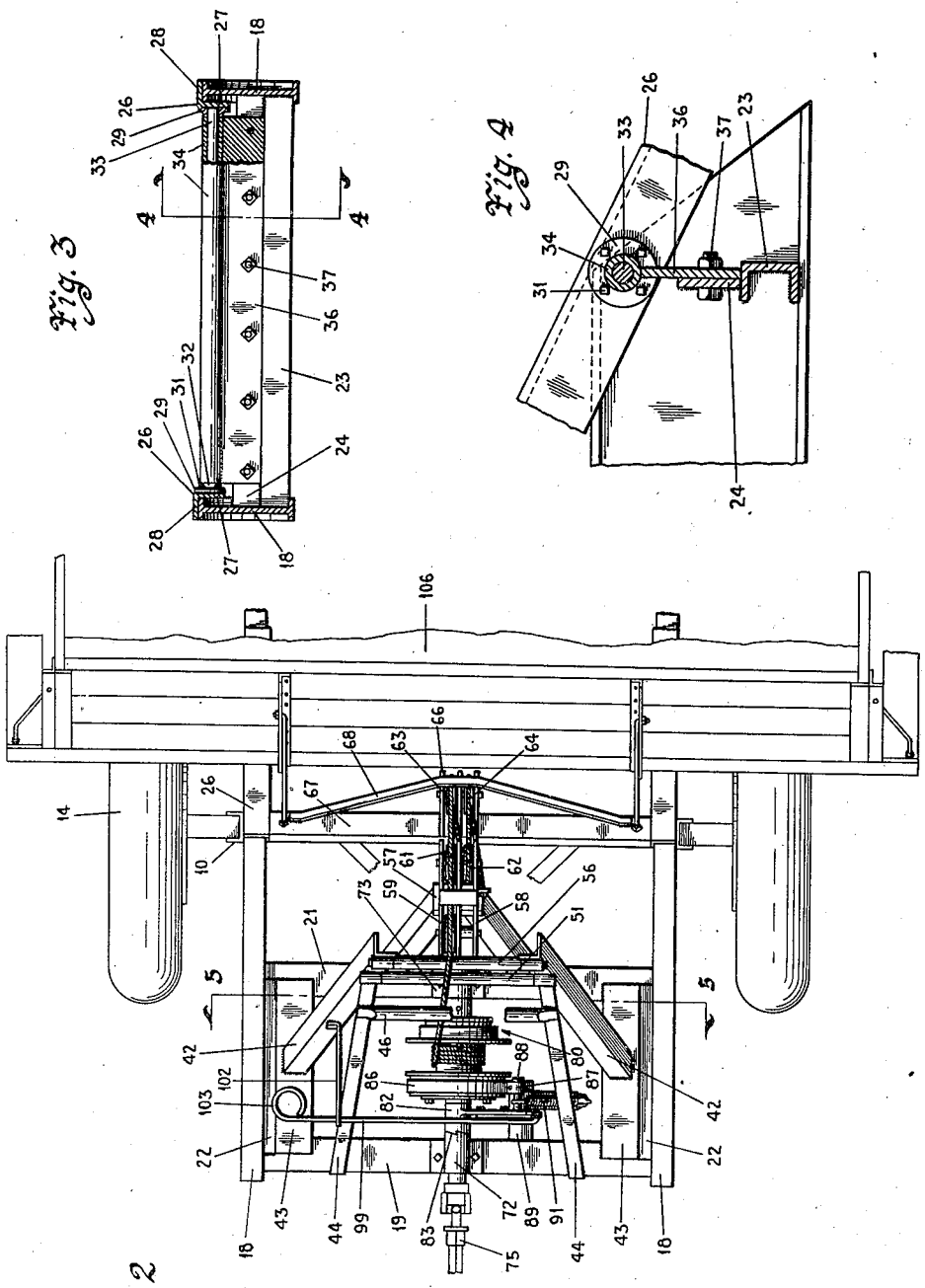

July 6, 1948.  G. E. COATS  2,444,808
DUMP VEHICLE
Filed Oct. 11, 1946  3 Sheets-Sheet 3
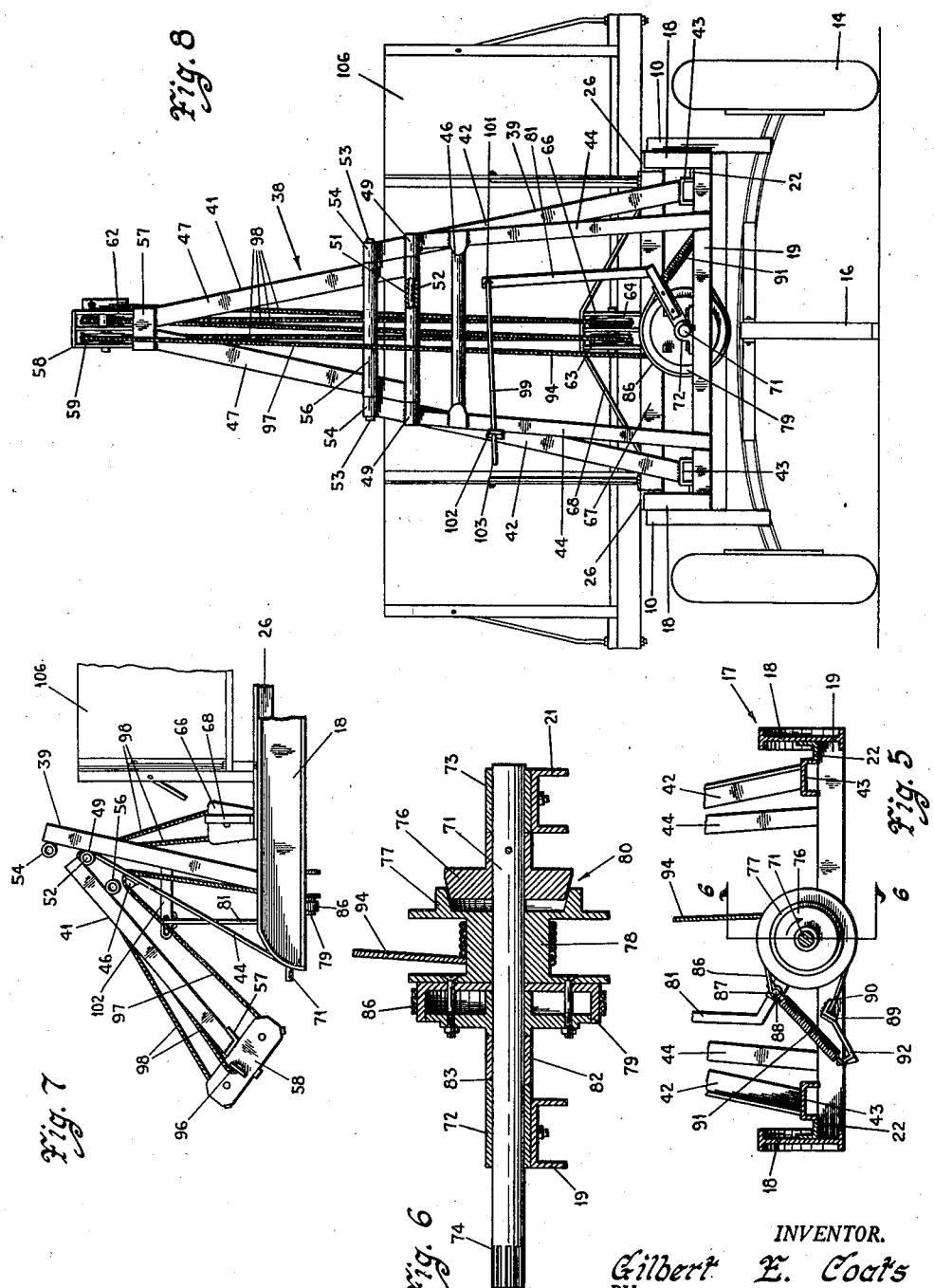
INVENTOR.
Gilbert E. Coats
BY
Rudolph L. Lowell
Attorney Patented July 6, 1948

2,444,808

UNITED STATES PATENT OFFICE 2,444,808

DUMP VEHICLE

Gilbert E. Coats, Fort Dodge, Iowa

Application October 11, 1946, Serial No. 702,766

3 Claims. (Cl. 298—19)

This invention relates generally to vehicles, and in particular to a dump vehicle having a mechanical hoist means for tiltably moving a dump frame supported on the vehicle chassis.

In the harvesting of corn, wagons of dump type are usually connected to the corn picking machine. On becoming filled the wagon is taken from the picker and connected with the tractor for transport to an elevating apparatus at the place for grain storage. With the wagon in a position such that a tilting of the wagon dump frame empties the grain from the wagon into the elevating apparatus, a general practice is to disconnect the tractor from the wagon while the dump frame is tilted, and then hitch the tractor to an emptied wagon for return to the field.

In this procedure difficulties are generally encountered in accomplishing a quick and efficient connection and disconnection of the tractor with the hoist means on the dump wagon. For example, in the use of a hydraulic hoist for the dump frame, the connecting and disconnecting of the oil lines between the wagon and the tractor often results in loss of oil and a consequent inability of the hoist to tilt the dump frame to a desired angle. Mechanical hoist means generally include an upright frame at the forward end of the wagon which interferes with parts of the picker machine in the maneuvering of the picker and wagon combination, and with the rear visibility of the tractor operator when the wagon is in transit.

An object of this invention, therefore, is to provide an improved dump wagon.

A further object of this invention is to provide a mechanical hoist for a dump wagon which is capable of being collapsed to substantially the top level of the wagon when the wagon is in transport.

Another object of this invention is to provide a dump wagon of farm type in which a mechanical hoist on the wagon is adapted to be operated from the rear power take off of a tractor.

Still another object of this invention is to provide a dump wagon having a tiltable dump frame in which a hoist means for tilting the dump frame is quickly and easily connected with and disconnected from the rear power takeoff of a pulling tractor for the wagon.

A feature of this invention is found in the provision of a dump wagon in which a hoist means for tilting a pivoted dump frame on the wagon includes a collapsible upright frame at the front end of the wagon chassis and a winding drum arranged substantially below the upright frame. A cable, windable on the drum, extends over the upright frame for engagement with the dump frame. When the wagon is in transport, the upright frame is collapsed forwardly to a position substantially level with the top of the wagon.

A further feature of this invention is found in the provision of a dump wagon in which a mechanical lift means for a dump frame includes an upright frame having a pivoted top section movable to a collapsed position extending forwardly and downwardly of the upright frame. A cable, windable on a winding drum arranged below the upright frame, is movably supported on a first pulley means carried at the upper end of the pivoted top section and operatively engageable with a second pulley means mounted on the dump frame. When the top section is collapsed, supports carried on the upright frame are adapted to hold the cable in place on the pulley means.

Further objects, features and advantages of this invention will become apparent from the following description when taken in connection with the accompanying drawings, in which:

Fig. 1 is a side elevational view of the dump vehicle of this invention with the dump body in an elevated position;

Fig. 2 is a fragmentary enlarged plan view of the front portion of the vehicle;

Fig. 3 is a detail sectional view taken on the line 3—3 in Fig. 1;

Fig. 4 is an enlarged detail sectional view as seen on the line 4—4 in Fig. 3;

Fig. 5 is a transverse sectional view on the line 5—5 in Fig. 2;

Fig. 6 is an enlarged sectional view taken along the line 6—6 in Fig. 5;

Fig. 7 is a reduced fragmentary side elevational view of the front portion of the dump vehicle showing the hoist mechanism for the dump frame in a folded or transport position; and Fig. 8 is a front view of the dump vehicle shown in Fig. 1.

With reference to the drawings, the dump vehicle of this invention is illustrated in Fig. 1 as having a front gear 10 and a rear gear 11 suitably connected together by a reach member 12. Ground wheels 13 and 14 are carried on the rear gear 11 and the front gear 10 respectively. A tongue member 16 on the front gear is adapted for connection with a draw bar (not shown) for a usual farm tractor (not shown) which includes a rear power take-off.

Suitably supported across the bolster portions of the front and rear gears is a main frame indicated generally as 17, which includes a pair of side frame members 18 of an I-beam construction (Figs. 1 and 3). The front ends of the beam members 18 are connected together by a pair of longitudinally spaced channel members 19 and 21 (Fig. 2), located forwardly of the front gear 10 and welded at their opposite ends to the inner sides of the beam members 18. Welded between such opposite ends of the transverse members 19 and 21 and to the inner sides of the beam members 18 are longitudinally extended angle members 22.

The rear ends of the beam members 18 (Figs. 3 and 4) are connected together by a transverse channel member 23 positioned adjacent to the lower ends of the beam members 18. Welded on the top of the channel member 23 is an upright plate member 24 which has its ends spaced inwardly from the beam members 18.

A pivoted dump frame, designated generally as 25, includes a pair of side frame members 26 (Figs. 1 and 3) of an angle iron construction. The angle members 26 are spaced a distance apart to provide for the reception of their vertically extended legs 27 to the inside of the members 18, and for the support of their horizontal legs 28 on the top sides of the beam members 18, when the dump frame is in a lowered position.

The rear end of the dump frame 25 is pivotally supported at the rear end of the main frame 17 (Figs. 3 and 4) by the provision of means including bracket members 29 oppositely arranged on the pivoted frame and secured to the vertical legs 27 of the side members 26 by bolts 31.

The brackets 29 are integrally formed with inwardly extended annular flanges 32 which constitute bearings for rotatably supporting the opposite ends of a transverse pivot shaft 33. Loosely mounted on the shaft 33, between the bearings 32, is a sleeve member 34 having a plate member 36 welded to its underside. The plate 36 on the pivoted frame 25 and the plate member 24 on the main frame 17 are adapted to overlap each other in a side by side relation and are formed with aligned openings to receive bolts 37.

In the assembly of the dump frame pivotal support, the shaft 33 and sleeve 34 are initially assembled with the bearings 32. This assembly is then moved between the side angle members 26 to positions providing for the bolting of the bearings 32 with the members 26. At this bolted position of the bearings 32 the plate members 24 and 36 are relatively arranged so as to be connectible by the bolts 37.

The hoist mechanism for tilting the dump frame comprises a collapsible or foldable upright frame, indicated at 38 (Figs. 1 and 8) which has a base or bottom section 39 and a pivoted top section 41. The base section 39 (Figs. 2 and 8) includes a pair of upright frame members 42, of an angle iron construction, which are secured at their lower ends, as by welding, to a pair of channel members 43, extended between the transverse frame members 19 and 21 along the inner sides of the longitudinal angle members 22. The channel members 43 are secured to the angle members 22 and to the channel members 19 and 21 by welding.

The upright frame members 42 are inclined rearwardly and inwardly toward each other and are braced by a pair of brace members 44 connected at one of their ends adjacent to the upper ends of the uprights 42, and at their lower ends to the front channel member 19. Spaced downwardly from the upper ends of the brace members 44 and connected therebetween is a supporting member 46.

The top section 41 of the upright frame 38 has a pair of upright angle members 47 inclined rearwardly and inwardly toward each other at a slope corresponding to the inclination of the uprights 44 of the base section 39 and have their lower ends receivable between the upper ends of the uprights 42. To pivotally support the top section 41 on the base section 39, there is provided a pair of bearing members 49 oppositely arranged on the uprights 42 at the upper ends of the brace members 44. The lower ends of the top section uprights 47 are connected together by a pipe or bearing member 51 (Fig. 8) which extends between the bearings 49. A pivot shaft 52, inserted through the pipe member 51 and the bearings 49, supports the top section 41 for pivotal movement relative to the base section 39.

The top section 41 is held in an upright position against pivotal movement by a rod or stop member 53 which is insertable through collar members 54 oppositely arranged at the upper ends of the uprights 42 of the base section 39, and through a transverse pipe member 56 connected between the uprights 47 of the pivoted section 41 at a position spaced upwardly from the bearing member 51.

The top ends of the uprights 47 are secured together by an angle plate 57 (Figs. 1 and 8) such that one of its legs forms the top surface of the pivoted frame 41. Mounted on the angle plate 57 is a longitudinally extended pulley bracket 58 of a construction providing for the rotatable support of a pulley 59 (Fig. 2) forwardly of the upright frame 38 and for the support of a pair of pulleys 61 and 62 at positions rearwardly of the upright frame 38 such that the pulleys 59 and 61 are rotatable in a common plane, and the pulley 62 is rotatable in a plane parallel to such common plane.

A pair of associate pulleys 63 and 64 (Figs. 2 and 8), for the pulleys 61 and 62, are rotatably supported in a substantially inverted U-shaped bracket 66 mounted on an angle member 67 connected between the forward ends of the side members 26 of the pivoted frame 25. A brace rod 68 extends across the top of the bracket 66 and has its ends secured to opposite ends of the angle member 67.

Extended longitudinally between the transverse channels 19 and 21, and substantially centrally of the main frame 17, is a shaft 71 (Figs. 5 and 6), which is rotatably supported in bearings 72 and 73 carried on the transverse channels 19 and 21, respectively. The forward end 74 of the shaft 71 is splined or fluted, as illustrated in Fig. 6, to provide for the connection of the shaft with the tractor rear power take-off through a usual telescoping shaft unit 75 (Fig. 2).

Mounted on the shaft 71 (Figs. 5 and 6) forwardly of the bearing 73, and rotatable with the shaft, is a conical or tapered member 76 which constitutes one of the units of a friction clutch mechanism, designated as 80. A shell member 77, constituting a second clutch unit and adapted to frictionally receive the conical member, is integrally formed as a part of a winding drum 78 which is free on the shaft 71. The shell member 77 projects outwardly from the rear end or face of the drum 78 (Fig. 6) and a brake drum 79 is bolted on the front face of the drum.

The clutch mechanism is actuated to connect and disconnect the winding drum with the shaft 71 by means including an upright operating lever 81, of an irregular shape, having its lower end mounted on a collar member 82 arranged on the shaft 71 between the front bearing 72 and the brake drum 79 (Fig. 2).

The adjacent ends of the front bearing 72 and the collar member 82 are formed with cooperating cam surfaces 83. Thus on movement of the operating lever 81 to the left, as viewed in Fig. 8, the collar member 82 is rotated relative to the bearing 72, whereby the cam surfaces 83 coact to axially move the winding drum 78 rearwardly on the shaft 71 to frictionally engage the clutch units 76 and 77 to provide for a rotation of the winding drum 78 with the shaft. On movement of the operating lever 81 to the right, as also viewed in Fig. 8, the clutch units 76 and 77 are thrown out of frictional engagement and the cam surfaces 83 are moved to relative positions providing for an axial movement of the winding drum 78 forwardly on the shaft 71 to provide for a free rotation of the shaft 71 relative to the winding drum.

Concurrently with operating the clutch mechainsm 80 the lever 81 also functions to operate a brake band 86 (Figs. 5 and 6) for the brake band 79. The brake band 86 (Figs. 2 and 5) has a loop 87 at one end adapted to receive a laterally extended bolt 88 at the lower end of the lever 81. The opposite end 90 of the brake band 86 is attached to the free end of an angle member bracket 89 which is projected rearwardly from the front transverse channel member 19. A tension spring 91 has one end secured to the bolt 87 while its opposite end is connected with an arm 92 carried on the angle bracket 89.

With the shaft 71 rotatable in a clockwise direction, as viewed in Fig. 5, movement of the lever 81 in a clockwise direction or toward the right, as also viewed in Fig. 5, releases the brake band 86 from the brake drum 79 against the action of the spring 91. Concurrently with this movement of the lever 81 the collar 82 is rotated relative to the bearing 72 to provide for a rearward movement of the brake drum 78 and the engagement of the clutch mechanism 80 in the manner above described. As a result the brake mechanism 79—86 is released concurrently with a connection of the drum 78 with the shaft 71.

On release of the lever 81 to the right, as viewed in Fig. 5, from its clutch engaging position, the clutch unit 77 is thrown forwardly out of frictional engagement with the clutch unit 76. With the lever in its clutch release position, the brake drum 78 is held against rotation by virtue of the closing of the brake band 86 on the brake drum 79 by the spring 91. The spring 91 thus functions to hold the brake band 86 in a braking position. However, the cam surfaces 83 are adapted to provide for a sufficient movement of the lever 81 to release the brake 86, while the clutch units 76 and 77 are out of frictional engagement. As a result, on movement of the lever 81 to connect the brake drum 78 with the shaft 71, the lever first moves through what might be termed a neutral position, in which the brake band is released and the clutch units 76 and 77 are out of frictional engagement whereby the brake drum 78 is free on the shaft 71. The function of this neutral position of the clutch lever 81 will appear later.

A cable 94 (Figs. 2 and 8), windable on the brake drum 78, extends upwardly from the brake drum, at a position forwardly of the upright frame 38, for travel over the pulleys 59 and 61. From the pulley 61 the cable extends downwardly to the rear side of the upright frame 38 about the pulley 63 on the pivoted frame 25, from the pulley 63 for travel upwardly about the pulley 62, downwardly from the pulley 62 about the pulley 64 and then upwardly for attachment of its free end 96 to the pulley bracket 58 at the top of the upright frame 38. It is seen, therefore, that a single pully length 97 is arranged forwardly of the upright frame 38, while four cable lengths 98 are positioned rearwardly of the upright frame. As best appears in Figs. 1 and 8, the forward cable length 97 travels between the upright frame 38 and the supporting bar 46, connected between the forwardly extended brace members 44.

In the operation of the dump vehicle of this invention, assume that the upright frame 38 is in its upright position, illustrated in Fig. 1, the pivoted dump frame 25 is in its lower position, illustrated in dotted lines in Fig. 1, and that the shaft 71 is connected with the rear power take-off of a tractor. To elevate the dump frame 25 the lever 81 (Fig. 8) is moved to the left, to release the brake band 86 and to connect the winding drum 78 with the shaft 71. This provides for a rotation of the drum 78 with the shaft 71 in a clockwise direction, as viewed in Fig. 5, to wind the cable 94 about the drum and elevate the dump frame 25 to its maximum elevated position shown in full lines in Fig. 1.

To hold the dump frame 25 at its maximum elevated position, or at any desired elevation, it is only necessary to release the lever 81. On this release the friction units 76 and 77 are automatically disengaged and the winding drum 78 is held against rotation by the action of the spring 91 on the brake band 86.

When the pivoted frame 25 is to be lowered, the lever 81 is moved toward the left, as viewed in Fig. 8, to its neutral position at which the brake band 86 is released from the brake drum 79 and the clutch units 76 and 77 are out of frictional engagement. This neutral position is readily determined by feel and by the dropping action of the dump frame 25.

To facilitate the actuation of the lever 81 from a position at one side of the wagon, a handle member 99 (Figs. 2 and 8) has one end pivoted at 101 to the upper end of the lever 81, and its opposite end loosely extended through a bracket member 102 extended forwardly from one of the upright frame members 42 of the base section 39, with such extended end being formed with a hand grip 103.

When the dump wagon is in transport on the highway or connected with a harvesting machine, the holding rod 53 is withdrawn from the upright frame 38 whereby the top section 41 is pivotally movable forwardly and downwardly of the base section 39 to its position illustrated in Fig. 7. The downward pivotal movement of the top section 41 is limited by the cable lengths 97 and 98, it being understood that the brake drum 78 is held against rotation by the brake 79—86 whenever the lever 81 is in its released position.

In the collapsed or folded position of the upright frame 38, the cable length 97 is maintained in operative position with the pulley 59 and the winding drum 78 by its support, intermediate the ends thereof, on the supporting member 46, connected between the brace members 44. In a similar manner the cable lengths 98 are held in operative relation with the pulleys 61—64 inclusive, by their engagement intermediate the ends thereof, across the sleeve member 51.

This folded position of the top pivoted section 41 provides for the overall height of the upright frame 38 being substantially within the vertical confines of a usual type wagon box 106, which is carried on the pivoted frame 25. Complete rear vision is thus afforded to the tractor operator, during travel on a highway. Further, the upright frame 38, in its collapsed position, offers a minimum of interference with any parts of a harvesting machine, when the wagon is connected thereto, and is completely out of the way of the usual wagon elevator carried on corn picker machines.

From a consideration of the above description, it is seen that the invention provides an improved dump wagon, adapted to elevate or tilt a dump frame at an angle of about 45° so as to completely remove material from the wagon, and with the hoisting mechanism, when not in use, being collapsed to a position substantially within the vertical confines of a usual wagon box. As a result the hoisting mechanism in no way interferes with a usual transport of the vehicle. Further, the lowering and raising of the dump frame is simply and easily accomplished by the manipulation of a single operating lever which is conveniently accessible from one side of the dump wagon. Also the hoist mechanism is capable of being connected and disconnected in a minimum of time from the rear power take-off of a tractor, and is efficient and positive in operation.

Although the invention has been described with respect to a preferred embodiment thereof, it is to be understood that it is not to be so limited, since changes and modifications can be made therein which are within the full intended scope of this invention, as defined by the appended claims.

I claim:

1. A dump wagon comprising, a main frame, a dump frame pivotally supported at the rear end on said main frame for tiltable movement, means for tilting said dump frame including an upright frame on the forward end of said main frame having a base portion and a pivoted top portion, means pivotally supporting said top portion on the base portion for pivotal movement to a first upright position and to a second pivotally moved position extended downwardly and forwardly, means for holding said pivoted frame in the first position therefor, a winding drum rotatably supported at the forward end of said main frame, flexible means windable on said drum, a first pulley means at the free end of said pivoted frame, a second pulley means at the free end of said dump frame, with a flexible means from said drum being extendible upwardly over said first pulley means, downwardly about said second pulley means and then upwardly for attachment to the free end of said upright frame, means adjacent the top end of said base portion for supporting said flexible means against movement away from said two pulley means when said pivoted frame is in the second position, and means for connecting said winding drum with a source of power.

2. A dump body assembly comprising, a vehicle chassis and a dump frame pivotally supported at the rear end of said chassis for tiltable movement, means for tilting said dump frame including a collapsible upright frame at the forward end of said chassis having a base portion and a pivoted top portion, transverse pivot means on said base portion pivotally supporting said top portion for pivotal movement to an upright position and to a collapsed position inclined forwardly and downwardly, means for holding said top portion in an upright position, a transverse support on the forward side of said base portion below said transverse pivot means, a winding drum rotatably supported on said chassis substantially below said upright frame, a flexible lifting means movably supported for travel over said upright frame having a front portion extended downwardly along the front side of said upright frame and to the rear side of said transverse support for connection with said winding drum, and a rear portion extended downwardly to the rear side of said upright frame for connection with said dump frame, with said front and rear portions of the lifting means, when said top portion is in a collapsed position, being supported intermediate their ends on said transverse support and pivot means, respectively, and means for connecting said winding drum with a source of power supply.

3. A dump wagon assembly including a main frame, a dump frame pivotally mounted at the rear end of said main frame for tiltable movement, means for tilting said dump frame including an upright frame on the forward end of said main frame having a top portion pivotally movable to a first upright position and to a second position inclined forwardly and downwardly, a first pulley means at the upper end of said top portion, a second pulley means on the front end of said dump frame, a winding drum supported on said main frame substantially below said upright frame, a flexible lifting means windable on said drum and movably supported on said first and second pulley means and connected with said upright frame to provide for a lifting of the dump frame on rotation of said winding drum in one direction, means for retaining said flexible means against movement off from said two pulley means when said top portion is in said second position therefor, and means for connecting said winding drum with a source of power supply.

GILBERT E. COATS.

REFERENCES CITED

The following references are of record in the file of this patent:

UNITED STATES PATENTS

| Number | Name | Date |
| --- | --- | --- |
| 1,343,283 | Sanderson | June 15, 1920 |
| 1,418,387 | Mayer | June 6, 1922 |
| 1,457,575 | Jansen | June 5, 1923 |